United States Patent [19]

Batzer et al.

[11] Patent Number: 4,799,692
[45] Date of Patent: Jan. 24, 1989

[54] RADIAL PRESSURE FLANGE SEAL

[75] Inventors: Thomas H. Batzer, Livermore; Wayne R. Call, Tracy, both of Calif.

[73] Assignee: The Regents of the University of California, Berkeley, Calif.

[21] Appl. No.: 96,756

[22] Filed: Sep. 15, 1987

Related U.S. Application Data

[63] Continuation of Ser. No. 895,643, Aug. 12, 1986, abandoned.

[51] Int. Cl.⁴ .................. B65D 53/00; F16J 15/08; F16L 17/00
[52] U.S. Cl. .................. 277/34; 220/232; 220/239; 277/236; 285/97
[58] Field of Search .................. 277/1, 3, 27, 190, 71, 277/12, 34, 34.3, 236; 215/269, 270; 220/66, 355, 354, 240, 239, 232, 353; 49/477; 285/97, 100, 107, 109, 95, 96, 113, 105; 403/5, 31

[56] References Cited

U.S. PATENT DOCUMENTS

| | | | |
|---|---|---|---|
| 213,688 | 3/1879 | Prindlf | 285/97 X |
| 572,901 | 12/1896 | Lehlach | 285/97 X |
| 606,838 | 7/1898 | Heins | 220/354 |
| 658,588 | 9/1900 | Reynolds et al. | 277/34 X |
| 734,265 | 7/1903 | Hough | 285/97 X |
| 794,987 | 7/1905 | Knenper | 285/97 X |
| 892,765 | 7/1908 | Seebeck | 285/97 X |
| 1,302,022 | 4/1919 | Drewry | 285/107 |
| 1,319,464 | 10/1919 | Durbin | 285/97 X |
| 1,439,452 | 12/1922 | Shaw | 285/97 X |
| 1,844,641 | 2/1932 | DeWein | 277/34 X |
| 2,016,226 | 10/1935 | Clansen | 220/355 |
| 2,083,842 | 6/1937 | Henning | 285/97 X |
| 2,201,322 | 5/1940 | Schwartz | 220/232 |
| 2,309,658 | 2/1943 | Miller | 277/34.3 |
| 2,388,925 | 11/1945 | Messinger | 277/34 |
| 2,785,824 | 3/1957 | Reeves | 277/34 X |
| 3,095,110 | 6/1963 | Pierce, Jr. | 220/378 X |
| 3,221,921 | 12/1965 | Silverman | 220/232 |
| 3,486,776 | 12/1969 | LeBaron | 403/5 |
| 3,695,637 | 10/1972 | Satterthwaite et al. | 285/97 |
| 3,719,374 | 3/1973 | Serrano | 285/97 |
| 3,764,037 | 10/1973 | Rothrock | 285/97 X |
| 3,770,161 | 11/1973 | Knizo | 220/355 |
| 3,782,738 | 1/1974 | Ohira et al. | 285/97 X |
| 3,788,651 | 1/1974 | Brown et al. | 277/34 |
| 4,222,589 | 9/1980 | Calle | 285/97 X |
| 4,276,945 | 7/1981 | Ward, Sr. | 285/97 X |

FOREIGN PATENT DOCUMENTS

| | | | |
|---|---|---|---|
| 1751550 | 12/1970 | Fed. Rep. of Germany | 285/97 |
| 68423 | 8/1969 | German Democratic Rep. | 285/97 |
| 13013 | 9/1916 | United Kingdom | 277/34.3 |
| 905808 | 9/1962 | United Kingdom | 49/477 |

Primary Examiner—Allan N. Shoap
Attorney, Agent, or Firm—Michael B. K. Lee

[57] ABSTRACT

This invention provides an all metal seal for vacuum or pressure vessels or systems. This invention does not use gaskets. The invention uses a flange which fits into a matching groove. Fluid pressure is applied in a chamber in the flange causing at least one of the flange walls to radially press against a side of the groove creating the seal between the flange wall and the groove side.

13 Claims, 4 Drawing Sheets

RADIAL PRESSURE FLANGE SEAL

The United States Government has rights in this invention pursuant to Contract No. w-7405-ENG-48 between the U.S. Department of Energy and the University of California, for the operation of Lawrence Livermore National Laboratory.

This is a continuation of application Ser. No. 06/895,643 filed Aug. 12, 1986, now abandoned.

FIELD OF THE INVENTION

The invention relates to providing a seal for vacuum and pressure vessels. More specifically the invention provides an all metal seal for ultra-high vacuum and pressure systems that is easy to seal and release.

BACKGROUND OF THE INVENTION

In vacuum and pressure systems, seals are used to maintain the vacuum or pressure. Almost all seals use a gasket. Most of these seals use the force that is used to clamp the sealed parts in contact to also create the seal. This requires many clamps or clamps which apply enough force over a wide area to eliminate gaps in the seal.

Most gaskets are made of an elastic material like rubber, since elastic gaskets can be reused. Ultra-high vacuums require that gaskets have a very low vapor pressure and a very low permeability. Frequently, elastic materials that have very low vapor pressures have relatively high permeabilities, and elastic materials with very low permeabilities have relatively high vapor pressures. In addition, vapor pressure increases as temperature increases so that all elastic gaskets must be kept below 250° F. to be useful in ultra-high vacuum systems. Many vacuum systems are subject to conditions such as extremely hot or cold or radiation environments, which cause elastic gaskets to breakdown. For these reasons, often elastic gaskets are unsuitable for ultra-high vacuums.

Many ultra-high vacuum systems use less-elastic metallic gaskets, since they have a lower vapor pressure than elastic gaskets. Since metallic gaskets have lower vapor pressures than elastic gaskets, they can be used in ultra-high vacuum systems at higher temperatures allowing the system to be degassed by baking. Because metallic gaskets are less elastic, in general they cannot be reused and are subject to leaks caused by stress relief and creep. Some vacuum systems are baked at temperatures up to 400° C. to outgas the system. At this temperature many metals creep. When the system cools down leaks are created by the creep and stress relief.

A few special seals are designed to prevent leaks due to creep and stress relief. A Batzer flange, known in the prior art, provides sufficient elastic deflection and seal force to maintain a seal when creep and relief stress are present. Batzer flanges have a slightly conical flange. The slight deflection in the flange making a conical shape, provides the elastic deflection. One problem with the Batzer seal is that as the size of the seal increases the flange size must increase. Large seals require prohibitively large flanges. Also the seal is along a thin edge which, makes the seal more vulnerable to corrosion or damage.

Another joint design is the "ConFlat." A soft metal gasket is captured in a rigid structure which plastically deforms the gasket. Long bakeout times at high temperatures relieve internal stresses and the force on the seal, allowing the joint to be leak-tight as long as differential thermal expansion is limited. The main problems with these seals is that they require the replacement of the gaskets when the seal is opened, they require many clamps to hold the pieces together and maintain the seal, and the assembly of the parts requires great care and causes much difficulty.

In many applications where seals are remotely created, such as in fission and fusion reactors, the difficulty in creating a seal is of special importance.

Further discussion of seals used in the prior art and their limitations are discussed in *Methods of Experimental Physics:*, L. Marton and C. Marton, Volume 14 "Vacuum Physics and Technology," Academic Press, 1979 incorporated by reference.

SUMMARY OF THE INVENTION

One object of the invention is to provide a seal for ultra-high vacuum systems and pressure systems that can be baked.

Another object of the invention is to provide a seal for ultra-high vacuum systems and pressure systems that does not need a gasket.

Another object of the invention is to provide a seal for ultra-high vacuum systems and pressure systems that is easy to create so that it can be installed remotely.

Another object of the invention is to provide a seal for ultra-high vacuum systems and pressure systems that does not use the force that holds the parts together as the sealing force.

Another object of the invention is to provide a seal for ultra-high vacuum systems and pressure systems that has a low vapor pressure allowing a system with few impurities.

Another object of the invention is to provide a seal for ultra-high vacuum systems and pressure systems that can be reused.

These and other objects will become apparent in the following detailed description. The present invention uses a radially applied pressure created by fluid pressure in an annular chamber in an annular flange, to create a vacuum or pressure seal. A vacuum or pressure seal shall be defined as a seal for sealing against vacuum or pressure.

DETAILED DESCRIPTION OF THE PREFERRED EMBODIMENT

Figure 1:
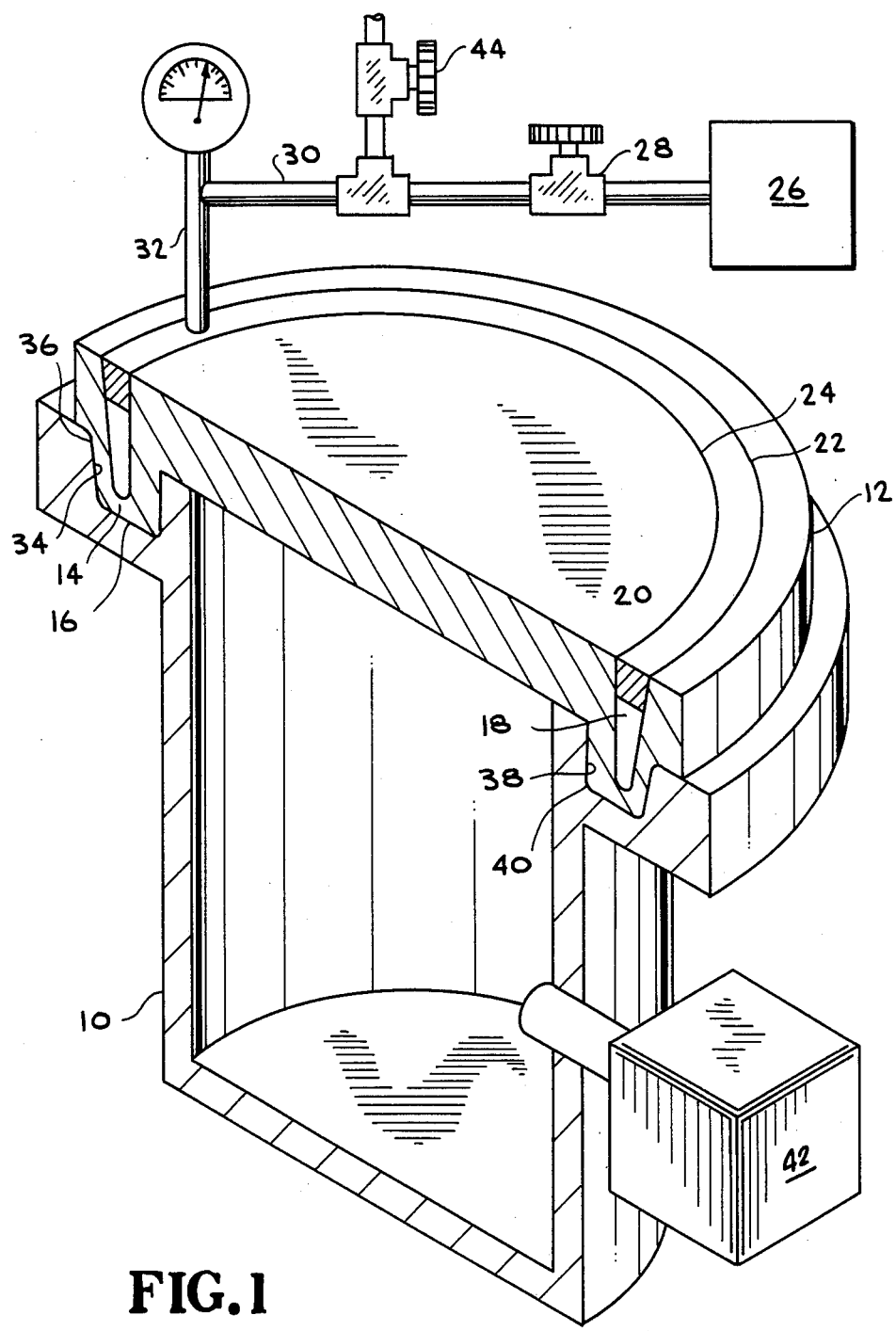
FIG. 1 is a cross-sectional view of a vacuum vessel and a cover which is sealed to the vessel with the inventive seal.
Figure 1A:
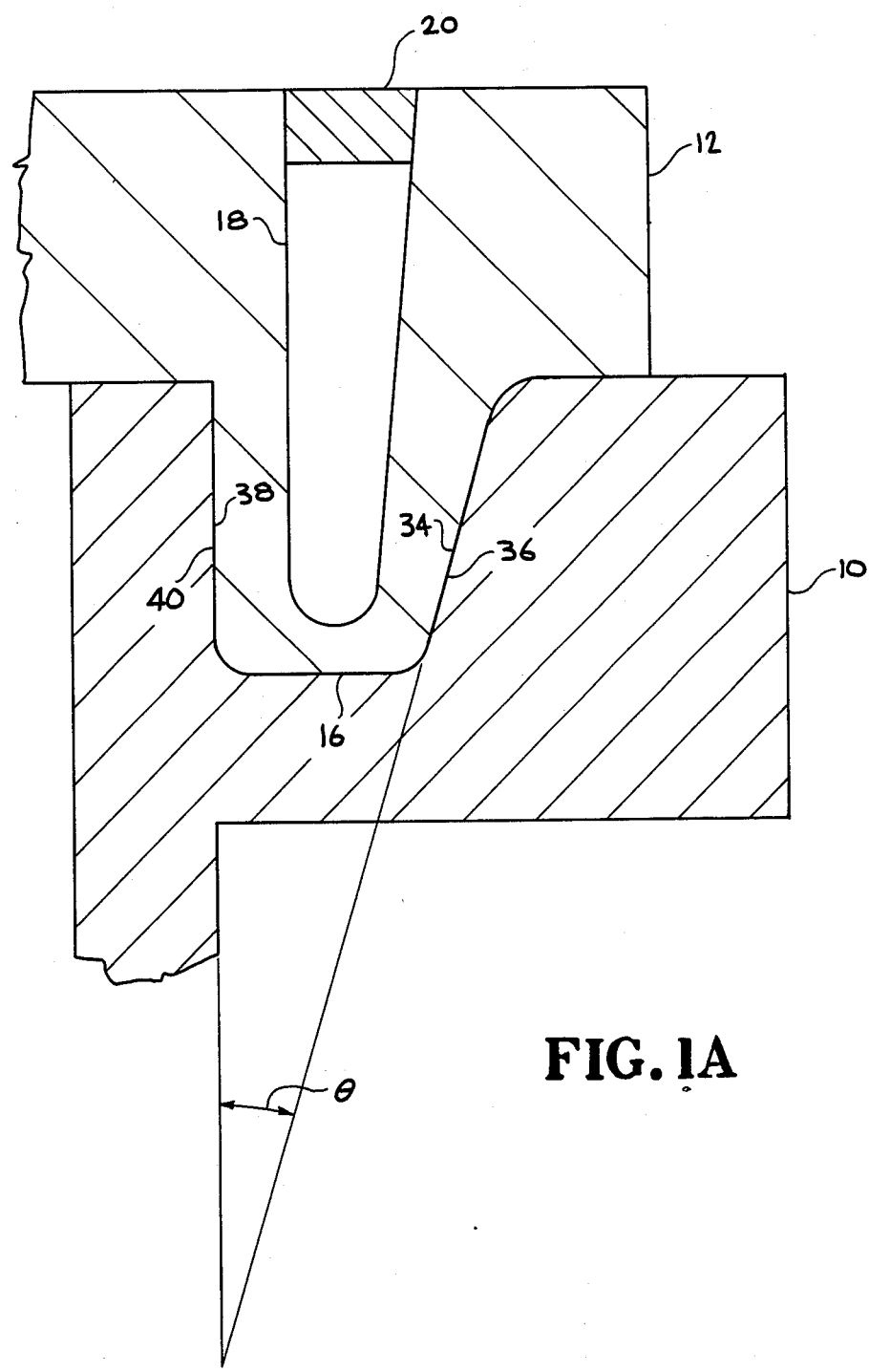
FIG. 1a is an enlargement of part of FIG. 1 showing the inventive seal.

FIG. 1 is a cross-sectional view of a vacuum vessel 10 with a cover 12 which is sealed to the vessel by one embodiment of the inventive seal. FIG. 1a is an enlargement of part of FIG. 1 showing more clearly the inventive seal and the angle" " between the inner and outer walls. The seal is created by an annular flange 14 attached to the cover 12, which fits into a matching annular groove 16 machined into the vessel 10. A matching groove, which mates with a given flange, is a groove into which the flange fits, as shown in this and the next embodiments. A chamber 18 is machined into flange 14. The chamber is sealed by cap 20. Annular welds 22 and 24 seal the cap 20 so that the chamber 18 has a fluid tight seal. Hydraulic pump 26 is used to pump fluid past valve 28 through pipes 30 and 32 into chamber 18 to increase the fluid pressure in chamber 18. Before the pressure in chamber 18 is increased, there is a thin gap between outer flange wall 34 and the outer side 36 of the groove 16. When the cover 12 is placed on the vessel 10, the inner side 38 of the flange and the inner side 40 of the groove are used as guides so that the outer flange wall 34 does not rub against the outer side 36 of the groove 16. Outer flange wall 34 and the outer side 36 of groove 16 are slightly angled as shown to prevent outer wall 34 and the outer side 36 of groove 16 from rubbing and scratching each other. Thus the outer flange wall is not parallel to the inner flange wall having an angle between them as shown. An angle of 3° is used in one embodiment. The edges of the flange and the groove are rounded to make it easier to seat the flange in the groove. To establish the seal, the cover 12 is placed on the vessel 10 as shown. In this embodiment, the vessel 10 and the cover 12 are made of aluminum. The outer flange wall 34 is 0.06 inches thick. In this embodiment, hydraulic pump 26 is used to increase the fluid pressure in the chamber to about 3,000 pounds per square inch. The fluid pressure will push outer flange wall 34 into outer side 36 of groove 16, creating a vacuum and pressure seal. Vacuum pump 42 creates the vacuum in vessel 10. This embodiment does not use vacuum grease, although some embodiments may apply vacuum grease to the flange. This seal has been tested with a leak rate of $10^{-9}$ Torr-liters/second. Although some clamping pressure may be needed to hold the cover against the chamber while the seal is being created, no clamping pressure is needed to maintain the seal. To remove the seal, the hydraulic pressure is released by opening hydraulic drain valve 44.

Figure 2:
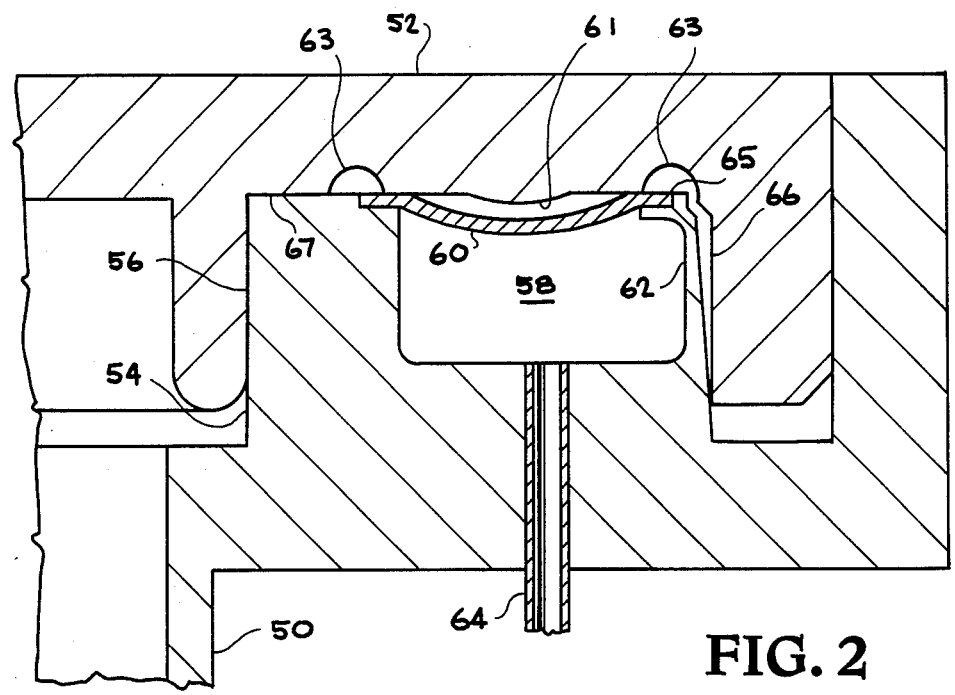
FIG. 2 is a cross-sectional view of another embodiment of the invention.

FIG. 2 is a cross-sectional view of another embodiment of the invention. Only part of a vacuum or pressure vessel 50 and part of a cover 52 are shown. In this embodiment, the vessel 50 has the radial flange 54 and the cover 52 has the matching groove 56, which demonstrates that the radial flange can be on either part. The flange 54 contains a fluid pressure chamber 58. The top flange wall is a thin curved annular plate 60. The thin annular plate 60 curves inward toward the interior of the fluid pressure chamber 58 so that it is convex with respect to the interior of the fluid pressure chamber 58, as shown. Adjoining this curved annulus 60 is a slightly thicker outer flange wall 62. Fluid pressure is added to chamber 58 by pipe 64. Sufficient fluid pressure will cause plate 60 to flatten, which will cause outer flange wall 62 to bend. This bending will cause part of outer flange wall 62 to push against outer groove wall 66 creating a vacuum or pressure seal. A bump 61 is provided as shown to prevent plate 60 from becoming completely flat or bending in the opposite direction (over bending). If plate 60 becomes perfectly flat, the annular plate 60 will lock, which would make releasing the seal very difficult. If plate 60 bends in the opposite direction, the seal would release. Grooves 63 are provided to prevent weld lines 65 from rubbing and binding against the side of the groove 67.

Figure 3:
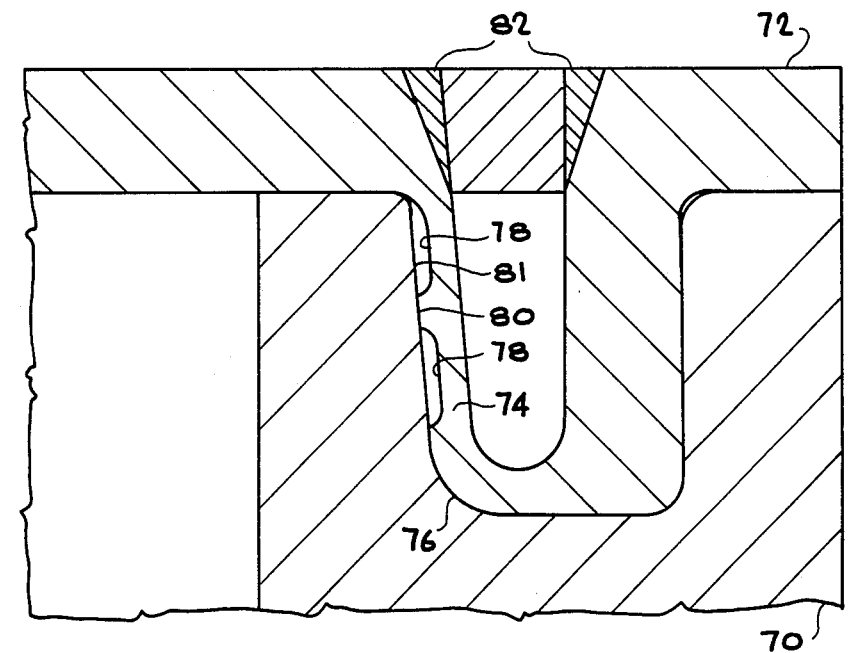
FIG. 3 is a cross-sectional view of another embodiment of the invention.

FIG. 3 is a cross-sectional view of another embodiment of the invention. Only part of a vacuum or pressure vessel 70 and part of a cover 72 are shown. This embodiment is almost the same as the embodiment shown in FIG. 1. One main difference is that the thin wall 74 is the inner flange 76 wall. Another main difference is that the thin wall 74 of the flange 76 has two grooves 78 machined into it, thus creating a ridge 80, which reduces the contact area between the thin wall 74 and the side 81 of the groove. The side 81 of the groove is flat. Since the contact area is reduced, the pressure at this ridge between the ridge and the side 81 of the groove is increased. Another difference is that the annular weld areas 82 are much deeper than the weld area of the embodiment shown in FIG. 1. The outer flange wall is not parallel to the inner flange wall as shown.

Figure 4:
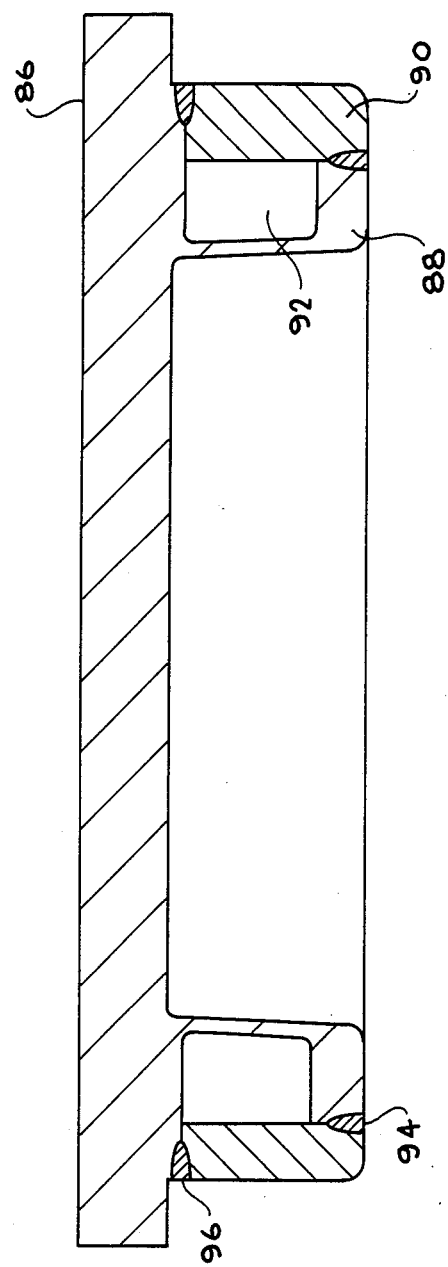
FIG. 4 is a cross-sectional view of another embodiment of the invention.

FIG. 4 is a cross-sectional view of another embodiment of the invention. FIG. 4 is a cross-sectional view of a cover 86 with a flange 88. In this embodiment annular cap 90, used to seal the chamber 92 in flange 88, forms the outer wall of flange 88. Annular welds 94 and 96 make chamber 92 fluid tight.

When the invention is used as a seal for a pressure vessel, clamps, not shown, may be needed to hold the cover against the vessel.

Changes and modifications in the specifically described embodiments can be carried out without departing from the scope of the invention which is intended to be limited only by the scope of the appended claims.

We claim:

1. An apparatus for sealing a vacuum or pressure system with a seal being established between a first object and a second object and around an opening that leads to the vacuum or pressure system, comprising:

a flange attached to the first object so that a gas cannot pass between the flange and the first object, with part of the flange forming a metallic first sealing element;

a matching groove in the second object that substantially matches and mates with the flange, wherein the matching groove has a plurality of sides and wherein the sides are joined in an air-tight manner, and with part of one side of the matching groove forming a second sealing element, with the matching groove shaped to provide a thin gap between the first sealing element and the groove and the second sealing element and the flange so that as the flange is inserted in an axial direction into the groove the first sealing element does not touch the groove and the second sealing element does not touch the flange, and wherein the flange and groove surround the opening when the flange is inserted in the groove;

a closed fluid tight chamber within the flange;

means for guiding the flange in the axial direction into the groove and preventing the first sealing element from touching the groove and the second sealing element from touching the flange as the flange is inserted into the groove;

means for directing fluid into the fluid-tight chamber for creating fluid pressure in the fluid-tight chamber after the flange is inserted in the matching groove to radially press at least a portion of the first sealing element against at least a portion of the second sealing element to form the seal around the opening and between the first and second sealing elements;

means for directing fluid out of the fluid-tight chamber; and wherein the flange comprises in inner wall, an outer wall and a connecting wall, which form the sides of the fluid-tight chamber, and wherein at least part of one of these walls forms the first sealing element; and wherein the groove comprises an inner side, an outer side and a connecting side, and wherein at least part of one of these sides forms the second sealing element.

2. An apparatus, as recited in claim 1, wherein the flange is tapered so that the inner wall and the outer wall of the flange are not parallel.

3. An apparatus as recited in claim 2, wherein the first sealing element has a ridge.

4. An apparatus, as recited in claim 3, wherein the flange further comprises rounded edges.

5. An apparatus, as recited in claim 4, wherein the first sealing element is formed by at least part of the inner flange wall and the second sealing element is formed by at least part of the inner side of the groove.

6. An apparatus, as recited in claim 5, wherein the means for guiding the flange, comprises the outer flange wall and the outer side of the groove, wherein the outer flange wall and the outer side of the groove are substantially parallel to the axial direction.

7. An apparatus, as recited in claim 2, wherein the first sealing element is formed by at least part of the outer flange wall and the second sealing element is formed by at least part of the outer side of the groove.

8. An apparatus, as recited in claim 7, wherein the means for guiding the flange comprises, the inner flange wall and the inner side of the groove, wherein the inner flange wall and the inner side of the groove are substantially parallel to the axial direction.

9. An apparatus, as recited in claim 2, wherein the connecting flange wall is metallic and curved so that it is convex with respect to the interior of the fluid-tight chamber and wherein the connecting wall is sufficiently thin to flatten under fluid pressure thus pushing the first sealing element radially against the second sealing element.

10. An apparatus, as recited in claim 9, further comprising:
weld lines along the connecting wall;
means for preventing the connecting wall from locking or over bending; and
means for preventing the weld lines from rubbing or binding against the connecting side of the groove.

11. An apparatus, as recited in claim 2, wherein the fluid tight chamber, comprises, an annular chamber in the flange and an annular cap to seal the annular chamber.

12. An apparatus, as recited in claim 2, wherein the second sealing element is metallic.

13. An apparatus, as recited in claim 2, wherein the outer wall of the flange, comprises, an annular cap welded to the connecting flange wall and the first object.

* * * * *